(12) United States Patent
West et al.

(10) Patent No.: US 8,632,901 B2
(45) Date of Patent: Jan. 21, 2014

(54) DISH SHAPED AND PRESSURE EQUALIZING ELECTRODES FOR ELECTROCHEMICAL BATTERIES

(75) Inventors: Jon Kenneth West, Gainesville, FL (US); Martin Patrick Higgins, Old Field, NY (US); Julius Regalado, Gainesville, FL (US); Anthony George, Coventry, RI (US)

(73) Assignee: G4 Synergetics, Inc., Roslyn, NY (US)

( * ) Notice: Subject to any disclaimer, the term of this patent is extended or adjusted under 35 U.S.C. 154(b) by 1320 days.

(21) Appl. No.: 12/258,854

(22) Filed: Oct. 27, 2008

(65) Prior Publication Data

US 2009/0142655 A1 Jun. 4, 2009

Related U.S. Application Data

(60) Provisional application No. 61/000,470, filed on Oct. 26, 2007, provisional application No. 61/002,528, filed on Nov. 9, 2007, provisional application No. 61/068,035, filed on Mar. 3, 2008.

(51) Int. Cl.
*H01M 2/12* (2006.01)
*H01M 2/16* (2006.01)
*H01M 2/00* (2006.01)

(52) U.S. Cl.
USPC .............. 429/53; 429/82; 429/128; 429/64; 429/210

(58) Field of Classification Search
None
See application file for complete search history.

(56) References Cited

U.S. PATENT DOCUMENTS

| | | |
|---|---|---|
| 3,169,889 A | 2/1965 | Zahn |
| 3,664,877 A | 5/1972 | Shaw |
| 3,783,024 A | 1/1974 | Holland et al. |
| 3,841,914 A | 10/1974 | Boyle et al. |
| 4,152,492 A | 5/1979 | McCartney |
| 4,159,367 A | 6/1979 | Berchielli et al. |
| 4,267,243 A | 5/1981 | Park et al. |
| 4,269,907 A | 5/1981 | Momyer et al. |
| 4,307,161 A | 12/1981 | Brown |
| 4,331,745 A | 5/1982 | Catanzarite |

(Continued)

FOREIGN PATENT DOCUMENTS

| | | |
|---|---|---|
| DE | 39 16 050 A1 | 11/1990 |
| DE | 196 08 326 A1 | 9/1997 |

(Continued)

OTHER PUBLICATIONS

"Abut." Dictionary.com n.d. Web Dec. 17, 2012.

(Continued)

*Primary Examiner* — Barbara Gilliam
*Assistant Examiner* — Angela Martin
(74) *Attorney, Agent, or Firm* — Ropes & Gray LLP

(57) ABSTRACT

A stacked battery has at least two cell segments arranged in a stack. Each cell segment may have a first electrode unit having a first active material electrode, a second electrode unit having a second active material electrode, and an electrolyte layer between the active material electrodes. One or more gaskets may be included in each cell segment to seal the electrolyte within the cell segment. The electrode units may be "dish shaped" and may contain a pressure equalization valve to reduce electrode unit deflection and improve pressure equalization between cell segments. The pressure equalization valve may allow a gas to diffuse through adjacent cell segments and may substantially prevent electrolyte from diffusing through.

17 Claims, 12 Drawing Sheets

(56) References Cited

U.S. PATENT DOCUMENTS

| | | |
|---|---|---|
| 4,352,867 A | 10/1982 | Catanzarite |
| 4,385,101 A | 5/1983 | Catanzarite |
| 4,539,268 A | 9/1985 | Rowlette |
| 4,542,082 A | 9/1985 | Rowlette |
| 4,565,749 A | 1/1986 | Van Ommering et al. |
| 4,567,119 A | 1/1986 | Lim |
| 4,614,025 A | 9/1986 | Van Ommering et al. |
| 4,828,939 A | 5/1989 | Turley et al. |
| 4,894,299 A | 1/1990 | Morse |
| 4,909,955 A | 3/1990 | Morris et al. |
| 4,927,717 A | 5/1990 | Turley et al. |
| 4,964,878 A | 10/1990 | Morris |
| 5,141,828 A | 8/1992 | Bennion et al. |
| 5,145,752 A | 9/1992 | Goldstein et al. |
| 5,185,218 A | 2/1993 | Brokman et al. |
| 5,190,833 A | 3/1993 | Goldstein et al. |
| 5,344,723 A * | 9/1994 | Bronoel et al. ............... 429/84 |
| 5,389,464 A | 2/1995 | Specht |
| 5,393,617 A | 2/1995 | Klein |
| 5,409,787 A | 4/1995 | Blanyer et al. |
| 5,411,818 A | 5/1995 | Barlow et al. |
| 5,464,453 A | 11/1995 | Tong et al. |
| 5,478,363 A | 12/1995 | Klein |
| 5,552,243 A | 9/1996 | Klein |
| 5,561,380 A | 10/1996 | Sway-Jin et al. |
| 5,567,544 A | 10/1996 | Lyman |
| 5,582,622 A | 12/1996 | Lafollette |
| 5,585,142 A | 12/1996 | Klein |
| 5,595,839 A | 1/1997 | Hossain |
| 5,611,823 A | 3/1997 | Klein |
| 5,652,073 A | 7/1997 | Lenhart et al. |
| 5,656,388 A | 8/1997 | Bugga et al. |
| 5,666,041 A | 9/1997 | Stuart et al. |
| 5,667,909 A | 9/1997 | Rodriguez et al. |
| 5,682,592 A | 10/1997 | Yun et al. |
| 5,698,342 A | 12/1997 | Klein |
| 5,698,967 A | 12/1997 | Baer et al. |
| 5,711,988 A | 1/1998 | Tsai et al. |
| 5,752,987 A | 5/1998 | Yang |
| 5,766,789 A | 6/1998 | James et al. |
| 5,821,009 A | 10/1998 | Hall |
| 5,851,698 A | 12/1998 | Reichman et al. |
| 5,882,817 A | 3/1999 | Hall et al. |
| 5,916,709 A | 6/1999 | Arias et al. |
| 5,980,977 A | 11/1999 | Deng et al. |
| 5,982,143 A | 11/1999 | Stuart |
| 6,063,525 A | 5/2000 | LaFollette |
| 6,074,774 A | 6/2000 | Semmens et al. |
| 6,190,795 B1 | 2/2001 | Daley |
| 6,330,925 B1 | 12/2001 | Ovshinsky et al. |
| 6,399,239 B2 | 6/2002 | Bolstad et al. |
| 6,413,668 B1 | 7/2002 | Sandberg et al. |
| 6,503,658 B1 | 1/2003 | Klein et al. |
| 6,514,296 B1 | 2/2003 | Tsai et al. |
| 6,555,267 B1 | 4/2003 | Broman et al. |
| 6,557,655 B2 | 5/2003 | Ovshinsky et al. |
| 6,565,836 B2 | 5/2003 | Ovshinsky et al. |
| 6,740,446 B2 | 5/2004 | Corrigan et al. |
| 6,759,034 B2 | 7/2004 | Ovshinsky et al. |
| 6,806,001 B1 | 10/2004 | Benczur-Uermoessy et al. |
| 6,824,914 B2 | 11/2004 | Iyer |
| 6,837,321 B2 | 1/2005 | Ovshinsky et al. |
| 6,887,620 B2 | 5/2005 | Klein et al. |
| 6,908,711 B2 | 6/2005 | Fauteux et al. |
| 6,969,567 B1 | 11/2005 | Higley et al. |
| 6,986,967 B2 | 1/2006 | Barton et al. |
| 7,097,937 B2 | 8/2006 | Fredriksson et al. |
| D533,832 S | 12/2006 | Hock |
| 7,144,654 B2 | 12/2006 | LaFollette et al. |
| 7,195,840 B2 | 3/2007 | Kaun |
| 7,244,527 B2 | 7/2007 | Klein |
| 7,258,949 B2 | 8/2007 | Fredriksson et al. |
| 7,279,248 B2 | 10/2007 | Fukuzawa et al. |
| 7,320,846 B2 | 1/2008 | Watanabe et al. |
| 7,326,493 B2 | 2/2008 | Martinet et al. |
| 7,358,008 B2 | 4/2008 | Nanno et al. |
| 7,384,707 B2 | 6/2008 | Nagayama et al. |
| 7,445,869 B2 | 11/2008 | Puester et al. |
| 2002/0160263 A1 | 10/2002 | Corrigan et al. |
| 2003/0013007 A1 | 1/2003 | Kaun |
| 2003/0013016 A1 | 1/2003 | Puester et al. |
| 2003/0070276 A1 | 4/2003 | Nanno et al. |
| 2004/0086779 A1* | 5/2004 | Higley et al. ............... 429/86 |
| 2004/0157101 A1 | 8/2004 | Smedley |
| 2004/0161667 A1 | 8/2004 | Fukuzawa et al. |
| 2004/0219428 A1 | 11/2004 | Nagayama |
| 2004/0229107 A1 | 11/2004 | Smedley |
| 2004/0253512 A1 | 12/2004 | Watanabe et al. |
| 2005/0003270 A1 | 1/2005 | Phillips |
| 2005/0048371 A1 | 3/2005 | Nagayama et al. |
| 2005/0069768 A1 | 3/2005 | Martinet et al. |
| 2005/0084754 A1 | 4/2005 | Klein |
| 2005/0112471 A1 | 5/2005 | Chen et al. |
| 2005/0123829 A1 | 6/2005 | Fukui et al. |
| 2005/0147876 A1 | 7/2005 | Izumi et al. |
| 2005/0260493 A1 | 11/2005 | Frederiksson et al. |
| 2006/0003223 A1 | 1/2006 | Willson et al. |
| 2006/0115729 A1 | 6/2006 | Lee |
| 2006/0292443 A1 | 12/2006 | Ogg et al. |
| 2008/0070106 A1 | 3/2008 | Hock et al. |
| 2008/0090146 A1 | 4/2008 | Batson |
| 2008/0124625 A1 | 5/2008 | Hock et al. |
| 2009/0023061 A1 | 1/2009 | Ogg et al. |
| 2009/0053586 A1 | 2/2009 | Fredriksson et al. |
| 2010/0304216 A1 | 12/2010 | Ogg et al. |

FOREIGN PATENT DOCUMENTS

| | | |
|---|---|---|
| EP | 0 025 663 A2 | 3/1981 |
| EP | 0 039 557 A1 | 11/1981 |
| EP | 0 040 458 A2 | 11/1981 |
| EP | 0 079 226 A1 | 5/1983 |
| EP | 0 188 873 A2 | 7/1986 |
| EP | 0 199 493 A1 | 10/1986 |
| EP | 0 221 347 A1 | 5/1987 |
| EP | 0 255 201 A2 | 2/1988 |
| EP | 0 187 145 B1 | 3/1991 |
| EP | 0 227 830 B1 | 9/1991 |
| EP | 0 221 183 B1 | 4/1992 |
| EP | 0 512 417 A1 | 11/1992 |
| EP | 0 551 204 A1 | 7/1993 |
| EP | 0 730 316 A1 | 9/1996 |
| EP | 0 800 223 A2 | 10/1997 |
| EP | 0 863 560 A2 | 9/1998 |
| EP | 0 863 565 A2 | 9/1998 |
| EP | 0 800 223 B1 | 8/2000 |
| EP | 0 787 365 B1 | 2/2001 |
| EP | 0 755 306 B1 | 1/2002 |
| EP | 1 195 355 A1 | 4/2002 |
| EP | 1 329 973 A1 | 7/2003 |
| EP | 1 391 961 | 2/2004 |
| EP | 1 418 638 A2 | 5/2004 |
| EP | 1 422 773 A1 | 5/2004 |
| EP | 1 422 780 A1 | 5/2004 |
| EP | 1 427 049 A1 | 6/2004 |
| EP | 1 445 809 A2 | 8/2004 |
| EP | 1 478 035 A2 | 11/2004 |
| EP | 1 482 582 A2 | 12/2004 |
| EP | 1 487 034 A2 | 12/2004 |
| EP | 1 841 001 A1 | 10/2007 |
| FR | 2 276 704 | 1/1976 |
| FR | 2 677 812 | 12/1992 |
| FR | 2 692 077 | 12/1993 |
| FR | 2 700 639 | 7/1994 |
| GB | 2 060 983 A | 5/1981 |
| GB | 1596106 | 8/1981 |
| GB | 2 150 739 A | 7/1985 |
| GB | 2 278 713 A | 12/1994 |
| GB | 2 294 803 A | 5/1996 |
| JP | 58 220359 | 12/1983 |
| JP | 58 223262 | 12/1983 |
| JP | 63 266766 | 11/1988 |
| JP | 4-95341 | 3/1992 |
| JP | 11-250886 | 9/1999 |

(56) References Cited

FOREIGN PATENT DOCUMENTS

| | | |
|---|---|---|
| JP | 2008 041523 | 2/2008 |
| WO | WO 98/15962 | 4/1998 |
| WO | WO 03/026042 | 3/2003 |
| WO | WO 03/032416 A1 | 4/2003 |
| WO | WO 2004/079851 | 9/2004 |
| WO | WO 2006/119289 A2 | 11/2006 |
| WO | WO 2008/023240 | 2/2008 |
| WO | WO 2008/023244 | 2/2008 |
| WO | WO 2008/059409 | 5/2008 |
| WO | WO2008059409 | 5/2008 |
| WO | WO 2008/070914 | 6/2008 |
| WO | WO 2008/081280 | 7/2008 |
| WO | WO2008081280 | 7/2008 |
| WO | WO 2008/130042 | 10/2008 |

OTHER PUBLICATIONS

"Adjacent." Dictionary.com n.d. Web Dec. 17, 2012.

Brown et al., "Bipolar Nickel-Metal Hydride Battery for Hybrid Electric Vehicles," The Fourteenth Annual Battery Conference on Applications and Advances, pp. 19-24, Jan. 12-15, 1999.

Cole et al., "Bipolar Nickel-Metal Hydride Batteries for Aerospace Applications," Aerospace and Electronic Systems Magazine, IEEE, vol. 15, Issue 1, pp. 39-45, Jan. 2000.

Golben et al., "A Low Pressure Bipolar Nickel Hydrogen Battery," Twelfth Annual Battery Conference on Applications and Advances, pp. 307-312, Jan. 14-17, 1997.

Klein et al., "Bipolar Nickel Metal Hydride Battery," 2003.

LaFollette et al., "Microfabricated Secondary Batteries for Remote, Autonomous, Electronic Devices," Sixteenth Annual Battery Conference on Applications and Advances, pp. 349-354, Jan. 9-12, 2001.

Landi et al., "Scale-Up of Manufacturing Processes for a Bipolar Nickel-Metal Hydride Aircraft Battery," Procs. 40th Power Sources Conf., Jun. 10-13, 2002.

Ohms et al., "Alkaline Batteries for Applications in Telecommunication," Telecommunications Energy Special, 2000, Accumulatorenwerke HOPPECKE, Germany, pp. 111-114, May 7-10, 2000.

Plivelich et al., "Pulse Power Nickel Metal Hydride Battery," 2002 Power Systems Conference, Electro Energy, Inc., 02PSC-69, pp. 1-6, Oct. 29-31, 2002.

Reisner et al., "Bipolar Nickel-Metal Hydride Battery for Hybrid Vehicles," Aerospace and Electronic Systems Magazine, IEEE, vol. 9, Issue 5, pp. 24-28, May 1994.

\* cited by examiner

FIG. 15    50

DISH SHAPED AND PRESSURE EQUALIZING ELECTRODES FOR ELECTROCHEMICAL BATTERIES

This application claims the benefit of U.S. Provisional Application No. 61/000,470, filed Oct. 26, 2007, and U.S. Provisional Application No. 61/002,528, filed Nov. 9, 2007, both of which are hereby incorporated by reference herein in their entireties, and this application claims the benefit of U.S. Provisional Application No. 61/068,035, filed Mar. 3, 2008.

FIELD OF THE INVENTION

This invention relates generally to batteries and, more particularly, this invention relates to a stacked bi-polar cell battery design with improved pressure equalization.

BACKGROUND OF THE INVENTION

Conventional batteries have been manufactured as either a wound cell battery that has only two electrodes or a standard prismatic cell battery that has many plate sets in parallel. In both of these types, the electrolyte may be shared everywhere within the battery. The wound cell and prismatic cell structures suffer from high electrical resistances due to their electrical paths having to cross multiple connections and span significantly long distances to cover the complete circuit from one cell to the next in a series arrangement.

Recently, various types of batteries with sealed cells in a stacked formation have been developed that are able to provide higher discharge rates and higher voltage potentials between external connectors than that of standard wound or prismatic batteries, and are therefore in high demand for certain applications. Certain types of these batteries with sealed cells in a stacked formation have been developed to generally include a stack of independently sealed pairs of mono-polar electrode units (MPUs). Each of these MPUs may be provided with either a positive active material electrode layer or a negative active material electrode layer coated on a first side of a current collector (see, e.g., Klein, U.S. Pat. No. 5,393,617, issued Feb. 28, 1995, which is hereby incorporated by reference herein in its entirety). An MPU with a positive active material electrode layer (i.e., a positive MPU) and an MPU with a negative active material electrode layer (i.e., a negative MPU) may have an electrolyte layer therebetween for electrically isolating the current collectors of those two MPUs. The current collectors of this pair of positive and negative MPUs, along with the active material electrode layers and electrolyte therebetween, may be sealed as a single cell or cell segment. A battery that includes a stack of such cells, each having a positive MPU and a negative MPU, shall be referred to herein as a "stacked mono-polar" battery.

The side of the current collector of the positive MPU not coated with an electrode layer in a first cell may be electrically coupled to the side of the current collector of the negative MPU not coated with an electrode layer in a second cell, such that the first and second cells are in a stacked formation. The series configuration of these cell segments in a stack may cause the voltage potential to be different between current collectors. However, if the current collectors of a particular cell contact each other or if the common electrolyte of the two MPUs in a particular cell is shared with any additional MPU in the stack, the voltage and energy of the battery would fade (i.e., discharge) quickly to zero. Therefore, it is desirable for a stacked mono-polar battery to independently seal the electrolyte of each of its cells from each of its other cells.

Other types of these batteries with sealed cells in a stacked formation have been developed to generally include a series of stacked bi-polar electrode units (BPUs). Each of these BPUs may be provided with a positive active material electrode layer and a negative active material electrode layer coated on opposite sides of a current collector. Any two BPUs may be stacked on top of one another with an electrolyte layer provided between the positive active material electrode layer of one of the BPUs and the negative active material electrode layer of the other one of the BPUs for electrically isolating the current collectors of those two BPUs. The current collectors of any two adjacent BPUs, along with the active material electrode layers and electrolyte therebetween, may also be a sealed single cell or cell segment. A battery that includes a stack of such cells, each having a portion of a first BPU and a portion of a second BPU, shall be referred to herein as a "stacked bi-polar" battery.

While the positive side of a first BPU and the negative side of a second BPU may form a first cell, the positive side of the second BPU may likewise form a second cell with the negative side of a third BPU or the negative side of a negative MPU, for example. Therefore, an individual BPU may be included in two different cells of a stacked bi-polar battery. The series configuration of these cells in a stack may cause the voltage potential to be different between current collectors. However, if the current collectors of a particular cell contact each other or if the common electrolyte of the two BPUs in a first cell is shared with any other cell in the stack, the voltage and energy of the battery would fade (i.e., discharge) quickly to zero.

Conventional stacked bi-polar batteries use flat electrode plates. By using flat plates and isolating them by use of an edge seal, cells in a stacked electrochemical battery may operate substantially independently. As the independent cells are charged and discharged, slight pressure differences may develop between adjacent cells. If the pressure difference between the adjacent cells exceeds a few pounds per square inch, then the flat electrode may deflect from the first cell towards the second cell. This deflection may strain the separator material of the second cell, creating a "hot spot" where a short circuit may develop. Because the physical components and the chemistry of individual cells will generally be slightly different from one another, pressure differentials between cells will generally exist. Therefore, it is desirable to mitigate the pressure differential from one cell to the next. Accordingly, it would be desirable to provide a stacked bi-polar battery with reduced electrode plate deflection and improved pressure equalization.

SUMMARY OF THE INVENTION

It is therefore an object of this invention to provide a stacked bi-polar battery design that mitigates the pressure differential from one cell to the next and that reduces electrode plate deflection.

In accordance with an embodiment, there is provided a bi-polar battery having a positive mono-polar electrode unit, a negative mono-polar electrode unit, and at least one bi-polar electrode unit stacked between the positive electrode unit and the negative electrode unit, wherein each of the electrode units may be dish shaped.

In accordance with an embodiment, there is provided a bi-polar battery having a positive mono-polar electrode unit, a negative mono-polar electrode unit, and at least one bi-polar electrode unit stacked between the positive electrode unit and the negative electrode unit. The bi-polar electrode unit may include a pressure equalization valve.

In accordance with an embodiment, there is provided a bi-polar battery having a positive mono-polar electrode unit, a negative mono-polar electrode unit, and at least one bi-polar electrode unit stacked between the positive electrode unit and the negative electrode unit. The bi-polar electrode unit may include a rupture disk valve.

BRIEF DESCRIPTION OF THE DRAWINGS

The above and other advantages of the invention will be more apparent upon consideration of the following detailed description, taken in conjunction with the accompanying drawings, in which like reference characters refer to like parts throughout, and in which.

DETAILED DESCRIPTION OF THE INVENTION

Apparatus and methods are provided for stacked batteries with reduced electrode plate deflection and improved pressure equalization, and are described below with reference to FIGS. 1-16.

Figure 1:
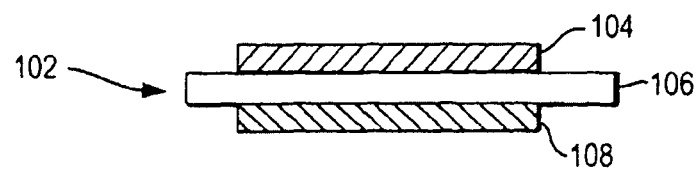
FIG. 1 shows a schematic cross-sectional view of a basic structure of a bi-polar electrode unit (BPU) according to an embodiment of the invention.

FIG. 1 shows an illustrative "flat plate" bi-polar electrode unit or BPU 102, in accordance with an embodiment of the present invention. Flat plate structures for use in stacked cell batteries are discussed in Ogg et al., PCT Application Publication No. WO 2008/100533, which is hereby incorporated by reference herein in its entirety. BPU 102 may include a positive active material electrode layer 104 that may be provided on a first side of an impermeable conductive substrate or current collector 106, and a negative active material electrode layer 108 that may be provided on the other side of impermeable conductive substrate 106 (see, e.g., Fukuzawa et al., U.S. Pat. No. 7,279,248, issued Oct. 9, 2007, which is hereby incorporated by reference herein in its entirety). In an embodiment, the radius of curvature of BPU 102 may be relatively large. For example, the radius of curvature for a "flat plate" electrode as shown in FIG. 1 may approach infinity.

Figure 2:
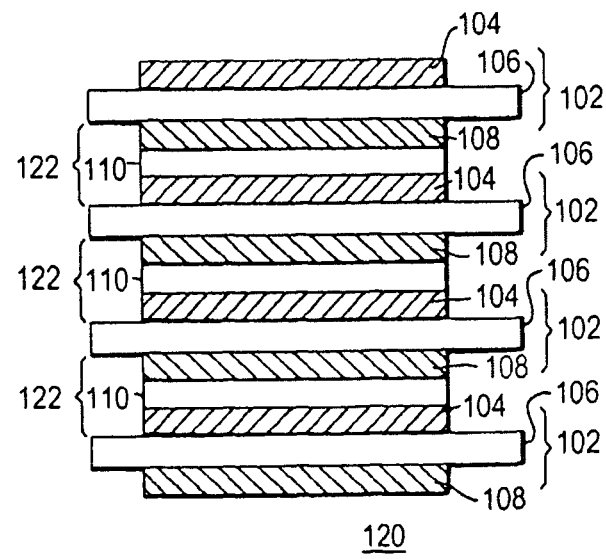
FIG. 2 shows a schematic cross-sectional view of a basic structure of a stack of BPUs of FIG. 1 according to an embodiment of the invention.

As shown in FIG. 2, for example, multiple BPUs 102 may be stacked substantially vertically into a stack 120, with an electrolyte layer 110 that may be provided between two adjacent BPUs 102, such that positive electrode layer 104 of one BPU 102 may be opposed to negative electrode layer 108 of an adjacent BPU 102 via electrolyte layer 110. Each electrolyte layer 110 may include a separator 109 that may hold an electrolyte 11 (see, e.g., FIG. 8). Separator 9 may electrically separate the positive electrode layer 104 and negative electrode layer 108 adjacent thereto, while allowing ionic transfer between the electrode units, as described in more detail below.

With continued reference to the stacked state of BPUs 102 in FIG. 2, for example, the components included in positive electrode layer 104 and substrate 106 of a first BPU 102, the negative electrode layer 108 and substrate 106 of a second BPU 102 adjacent to the first BPU 102, and the electrolyte layer 110 between the first and second BPUs 102 shall be referred to herein as a single "cell" or "cell segment" 122. Each impermeable substrate 106 of each cell segment 122 may be shared by the applicable adjacent cell segment 122.

Figure 3:
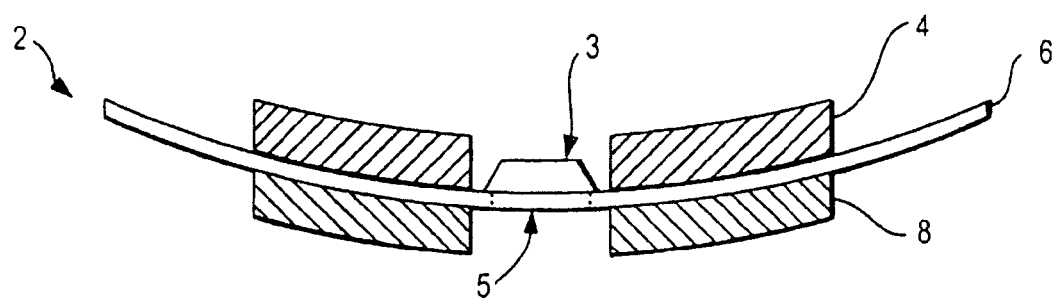
FIG. 3 shows a schematic cross-sectional view of a basic structure of a BPU with a dish-shaped electrode and a pressure equalization valve according to an embodiment of the invention.

FIG. 3 shows a schematic cross-sectional view of a basic structure of a "dish shaped" BPU 2 in accordance with an embodiment of the present invention. BPU 2 may include a positive active material electrode layer 4 that may be provided on a first side of an impermeable conductive substrate or current collector 6, and a negative active material electrode layer 8 that may be provided on the other side of impermeable conductive substrate 6. A hole (e.g., hole 5) may be provided, for example, in the center of substrate 6. The radius of curvature of BPU 2 may be relatively smaller for the "dish shaped" electrode embodiment as shown in FIG. 3 than for the "flat plate" electrode embodiment as shown in FIG. 1. The relatively smaller radius of curvature for the "dish shaped" electrode may give BPU 2 a substantially spherical shape. When BPU 2 is oriented concave-up, as it appears in FIG. 3, positive active material electrode layer 4 may be positioned on the concave side of BPU 2 and negative active material electrode layer 8 may be positioned on the opposite side.

Dish shaped BPU 2 may be sized to have any suitable dish radius. For example, given certain spatial requirements, a relatively small dish radius may be desired. Alternatively, given certain power requirements, without certain spatial requirements, a relatively large dish radius may be desired.

The shape of an electrode (e.g., "flat plate" or "dish shaped") may be substantially described by the radius of curvature of the electrode. For example, for a "flat plate" electrode (see, e.g., BPU 102 of FIG. 1), the radius of curvature of BPU 102 may be relatively large compared to the radius of curvature for a "dish shaped" electrode (see, e.g., BPU 2 of FIG. 3). For example, the radius of curvature for a flat plate electrode may approach infinity. The radius of curvature of a BPU (e.g., BPU 102) may substantially affect the BPU's ability to withstand pressure differences between cells. For example, as the radius of curvature is increased beyond about 100 inches, the pressure required to deflect a flat plate may be just above zero. For a relatively small pressure difference (e.g., 5 psi) the deflection of "flat plate" BPU 102 may be over about 0.100 inches. This amount may be relatively large considering that the separator thickness may be about 0.005 inches.

However, for a "dish shaped" electrode with a radius of about 6 inches, the deflection at about 5 psi may be reduced to about 0.001 inches. Dish design may allow for the parameters of pressure equalization valve 3 to be determined. For example, an equation for a dish shaped electrode deflection of about 0.002 inches may be solved for a suitable radius and thickness, given an assumed modulus of elasticity of any suitable material including, but not limited to, a mild steel, or any other material, or any combination thereof. Other methods of solving for a suitable geometry may also be used. Pressure equalization valve 3 may function to substantially equalize gases between adjacent cells for a pressure difference of about 1 psi or less.

There exist designs for power storage devices that allow gases to pass from an over-pressurized cell to a cell having less pressure. This has been done with external manifolds and channels in the top of battery cases to maintain equal pressures from cell to cell. However, these prior designs add sufficiently more weight to the battery and may be too bulky to be appropriately applied to a stacked bi-polar battery. In a stack of bi-polar electrodes, the problem of pressure equalization is amplified by the added problem of assembly and filling of the cells with electrolyte. However, in the "dish shaped" electrode embodiment, the dish may be used as a temporary location for the electrolyte while being absorbed by the separator and active electrode material bonded to the bottom of the dish. Once the electrolyte is absorbed then the next dished electrode may be placed over the separator and recently filled electrode. The electrolyte may not leak through the bottom of the dish during these process steps. Thus, the equalization hole in the center of BPU 2, for example, may be closed or covered during electrolyte filling. A semi-permeable membrane or a rupture disk, for example, may be desired to cover the hole in the electrode to substantially prevent electrolyte from draining into the lower cell. Thus, a pressure equalization valve may be used to mediate pressure differences arising between cells and also to aid assembly and manufacture of the battery.

BPU 2 may include pressure equalization valve or semi-permeable membrane 3 as shown in FIG. 3. Equalization valve 3 may be a disk made from any suitable material such as a non-conductive polymer, rubber, any other suitable material, or any combination thereof. In an embodiment of the invention, the disk may have either nanometer or micrometer sized holes, cuts, any other suitable perforations, or any combination thereof through the disk such that the disk may constitute a gas permeable membrane that may prevent electrolyte from passing through or may reduce the amount of electrolyte that passes through. Equalization valve 3 may be made of any suitable material resistant to chemical corrosion (e.g., due to electrolyte 11 of FIG. 8), including, but not limited to poly-vinyl, poly-sulfone, neoprene, or any combination thereof, for example. As shown in FIG. 3 equalization valve 3 and hole 5 may be positioned substantially in the center of substrate 6. Alternatively, equalization valve 3 and hole 5 may be placed at any location along substrate 6.

In an embodiment of the invention, equalization valve 3 may take the form of a gas permeable membrane utilizing chemical properties rather than mechanical properties (e.g., as a valve with cuts). In this embodiment, equalization valve 3 may be formed from any suitable sealant, such as Loctite® brand adhesives (made available by the Henkel Corporation that may be formed from silicon, acrylic, and/or fiber reinforced plastics (FRPs) and that may be impervious to electrolytes), any other suitable material, or any combination thereof. A graphitic carbon fiber bundle, any other suitable material, or any combination thereof, of, for example, about 1000 fibrils may be placed in the liquid sealant before it cures. After curing the sealant and fiber bundle, equalization valve 3 may be substantially formed. A quantum mechanical "hopping" mechanism may enable equalization valve 3 to substantially pass $O_2$ and $H_2$ molecules through adjacent cells in a stack and may prevent electrolyte from passing through or may reduce the amount of electrolyte that passes through. The chemical "hopping" mechanism may be substantially enabled by the material and chemical properties of the graphitic material. For example, in a graphitic carbon fiber bundle, diffusion forces may substantially allow hydrogen molecules from an over-pressurized cell to "hop" along the surface of the graphitic material via spaces on the six-membered carbon ring structure of the graphitic material.

Figure 4:
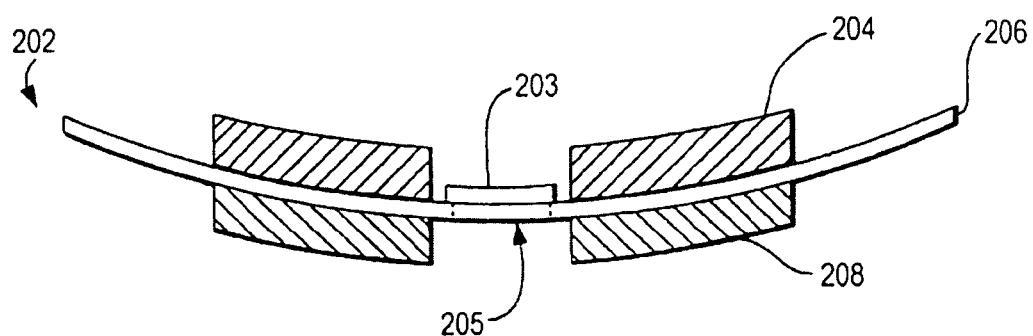
FIG. 4 shows a schematic cross-sectional view of a basic structure of a BPU with a dish-shaped electrode and a rupture disk valve according to an embodiment of the invention.

In an embodiment of the invention, pressure equalization valve 3 may be a rupture disk valve 203, as shown in FIG. 4, that may open to relieve pressure differences above about 1 psi between adjacent cells, for example. Rupture disk valve 203 may be made from brai, or a PVA-like film, any suitable polymer, metal, composite film, any other suitable material, or any combination thereof. Rupture disk valve 203 may be provided with a film over the valve hole which may allow a cell segment to be filled with electrolyte during manufacture while substantially preventing the electrolyte from spilling to an adjacent cell.

In the event of a rupture disk opening (e.g., due to a relatively large pressure difference between adjacent cells), hole 205 may allow an electrolyte to pass from one cell to an adjacent cell. However, if the orientation of the battery is substantially guaranteed to be in a particular position (e.g., BPU 202 concave-down), the electrolyte may not reach the hole due to the geometry of "dish shaped" BPU 202. Electrolyte may be substantially prevented from reaching hole 205 because hole 205 is at the center of substrate 206, which is at a relatively greater height than the edges of the substrate near the sealed gasket, where free electrolyte may collect. The battery may be laid on its side with substantially the same effect.

Figure 5:
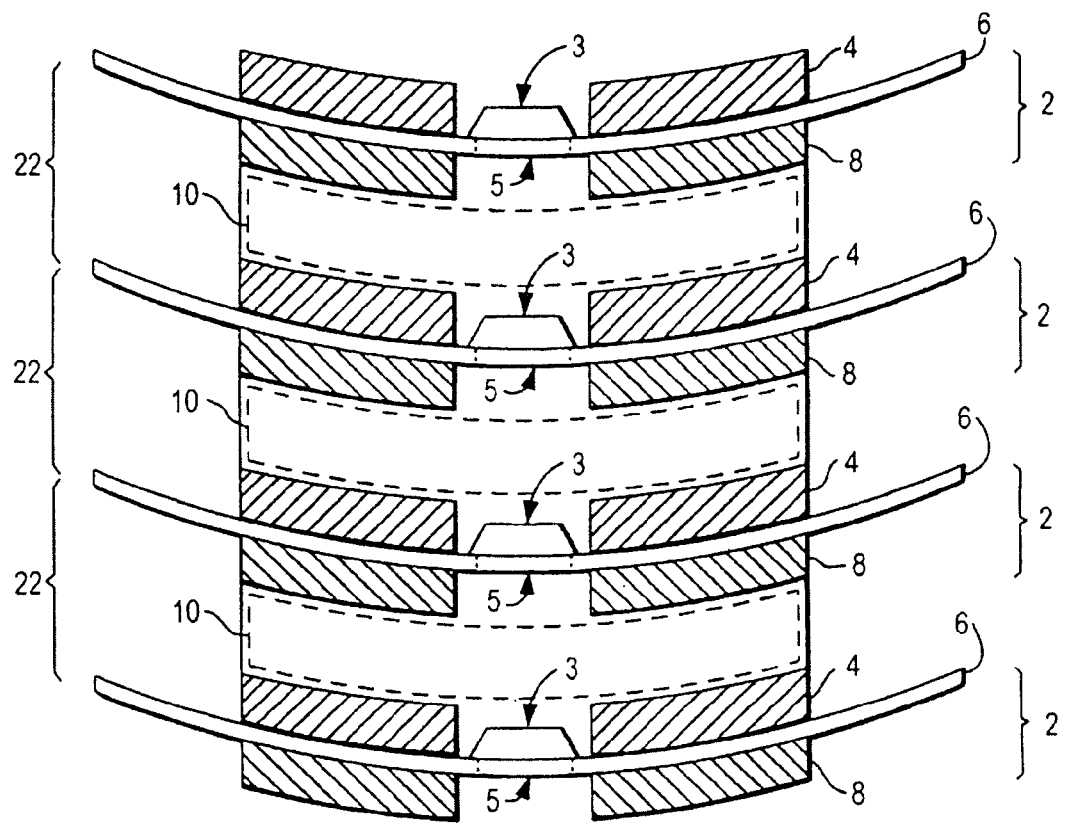
FIG. 5 shows a schematic cross-sectional view of a basic structure of a stack of BPUs of FIG. 3 according to an embodiment of the invention.

FIG. 5 shows a schematic cross-sectional view of a basic structure of a stack of BPUs 2 of FIG. 3 in accordance with an embodiment of the present invention. For example, multiple BPUs 2 may be stacked substantially vertically into a stack 20, with an electrolyte layer 10 that may be provided between two adjacent BPUs 2, such that positive electrode layer 4 of one BPU 2 may be opposed to negative electrode layer 8 of an adjacent BPU 2 via electrolyte layer 10. Each electrolyte layer 10 may include a separator 9 that may hold an electrolyte 11 (see, e.g., FIG. 8). Separator 9 may electrically separate the positive electrode layer 4 and negative electrode layer 8 adjacent thereto, while allowing ionic transfer between the electrode units, as described in more detail below.

With continued reference to the stacked state of BPUs 2 in FIG. 5, for example, the components included in positive electrode layer 4 and substrate 6 of a first BPU 2, the negative electrode layer 8 and substrate 6 of a second BPU 2 adjacent to the first BPU 2, and the electrolyte layer 10 between the first and second BPUs 2 shall be referred to herein as a single "cell" or "cell segment" 22. Each impermeable substrate 6 of each cell segment 22 may be shared by the applicable adjacent cell segment 22.

Figure 6:
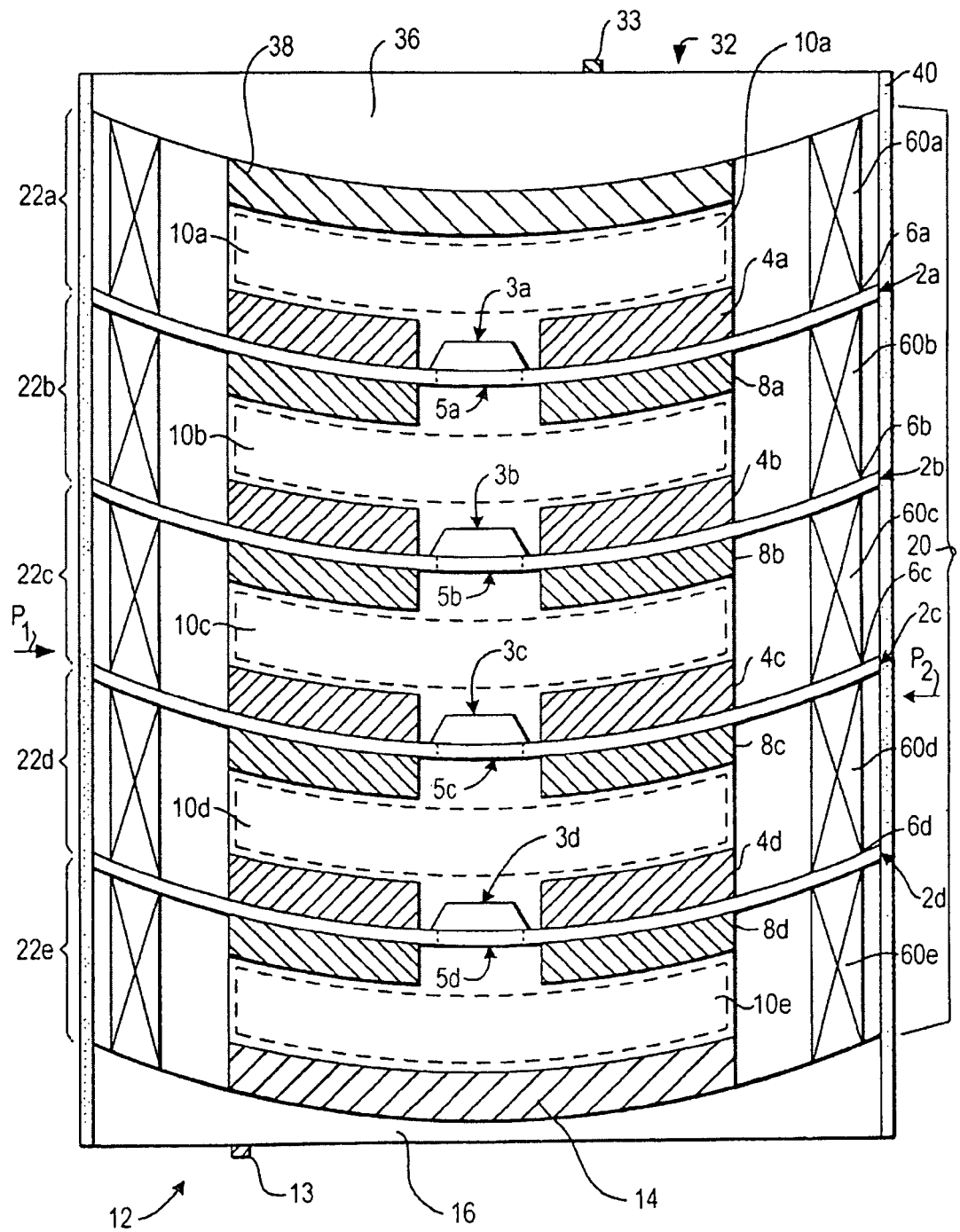
FIG. 6 shows a schematic cross-sectional view of a basic structure of a stacked bi-polar battery implementing the stack of BPUs of FIG. 5 according to an embodiment of the invention.

As shown in FIG. 6, for example, positive and negative terminals may be provided along with stack 20 of one or more BPUs 2 to constitute a stacked bi-polar battery 50 in accordance with an embodiment of the invention. A positive mono-polar electrode unit or MPU 12, that may include a positive active material electrode layer 14 provided on one side of an impermeable conductive substrate 16, may be positioned at a first end of stack 20 with an electrolyte layer provided therebetween (i.e., electrolyte layer 10e), such that positive electrode layer 14 of positive MPU 12 may be opposed to a negative electrode layer (i.e., layer 8d) of the BPU (i.e., BPU 2d) at that first end of stack 20 via the electrolyte layer 10e. A negative mono-polar electrode unit or MPU 32, that may include a negative active material electrode layer 38 provided on one side of an impermeable conductive substrate 36, may be positioned at the second end of stack 20 with an electrolyte layer provided therebetween (i.e., electrolyte layer 10a), such that negative electrode layer 38 of negative MPU 32 may be opposed to a positive electrode layer (i.e., layer 4a) of the BPU (i.e., BPU 2a) at that second end of stack 20 via the electrolyte layer 10a. MPUs 12 and 32 may be provided with corresponding positive and negative electrode leads 13 and 33, respectively.

It should be noted that the substrate and electrode layer of each MPU may form a cell segment 22 with the substrate and electrode layer of its adjacent BPU 2, and the electrolyte layer 10 therebetween, as shown in FIG. 6, for example (see, e.g., segments 22a and 22e). The number of stacked BPUs 2 in stack 20 may be one or more, and may be appropriately determined in order to correspond to a desired voltage for battery 50. Each BPU 2 may provide any desired potential, such that a desired voltage for battery 50 may be achieved by effectively adding the potentials provided by each component BPU 2. It will be understood that each BPU 2 need not provide identical potentials.

In one suitable embodiment, bi-polar battery 50 may be structured so that BPU stack 20 and its respective positive and negative MPUs 12 and 32 may be at least partially encapsulated (e.g., hermetically sealed) into a battery case or wrapper 40 under reduced pressure. MPU conductive substrates 16 and 36 (or at least their respective electrode leads 13 and 33) may be drawn out of battery case 40, so as to mitigate impacts from the exterior upon usage and to prevent environmental degradation, for example.

In order to prevent electrolyte of a first cell segment (see, e.g., electrolyte 11a of cell segment 22a of FIG. 8) from combining with the electrolyte of another cell segment (see, e.g., electrolyte 11b of cell segment 22b of FIG. 8), gaskets or sealants may be stacked with the electrolyte layers between adjacent electrode units to seal electrolyte within its particular cell segment. A gasket or sealant may be any suitable compressible or incompressible solid or viscous material, or combinations thereof, for example, that may interact with adjacent electrode units of a particular cell to seal electrolyte therebetween. In one suitable arrangement, as shown in FIG. 6, for example, the bi-polar battery of the invention may include a gasket or seal 60 that may be positioned as a barrier about electrolyte layer 10 and active material electrode layers 4/14 and 8/38 of each cell segment 22. The gasket or sealant may be continuous and closed and may seal electrolyte between the gasket and the adjacent electrode units of that cell (i.e., the BPUs or the BPU and MPU adjacent to that gasket or seal). The gasket or sealant may provide appropriate spacing between the adjacent electrode units of that cell, for example.

In sealing the cell segments of stacked bi-polar battery 50 to prevent electrolyte of a first cell segment (see, e.g., electrolyte 11a of cell segment 22a of FIG. 8) from combining with the electrolyte of another cell segment (see, e.g., electrolyte 11b of cell segment 22b of FIG. 8), cell segments may produce a pressure differential between adjacent cells (e.g., cells 22a-22b) as the cells are charged and discharged. Equalization valves 3a-3d may serve to substantially decrease the pressure differences thus arising. As previously presented equalization valve 3, located at hole 5, may operate as a semi-permeable membrane, or rupture disk, either mechanically or chemically to allow the transfer of a gas and to substantially prevent the transfer of electrolyte. A battery (e.g., battery 50) may have BPUs (e.g., BPUs 2a-2d) having any combination of equalization valves (e.g., equalization valves 3a-3d). For example, BPU 2a may have equalization valve 3a that operates chemically, BPU 2b may have equalization valve 3b that operates mechanically, BPU 2c may have rupture disk valve 3c, and BPU 2d may have rupture disk valve 3d. In addition, as shown in FIG. 6 equalization valves 3a-d and holes 5a-d may be positioned substantially in the center of substrates 6a-d. In an embodiment, equalization valves 3a-d and holes 5a-d may be placed at any location along the substrate.

Figure 7:
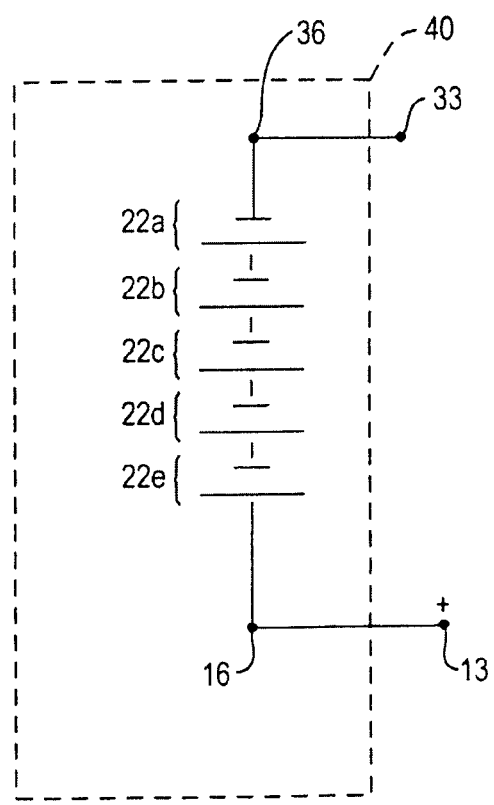
FIG. 7 shows a schematic circuit diagram of the basic constitution of the bi-polar battery of FIG. 6.

In an embodiment of the invention, pressure may be applied to the sides of case 40 in the direction of arrows P1 and P2 for compressing and holding cell segments 22 and gaskets 60 in the sealed configuration shown in FIG. 6, for example. Such a bi-polar battery 50 may include multiple cell segments 22 stacked and series-connected, as shown in FIG. 7, to provide the desired voltage.

Figure 8:
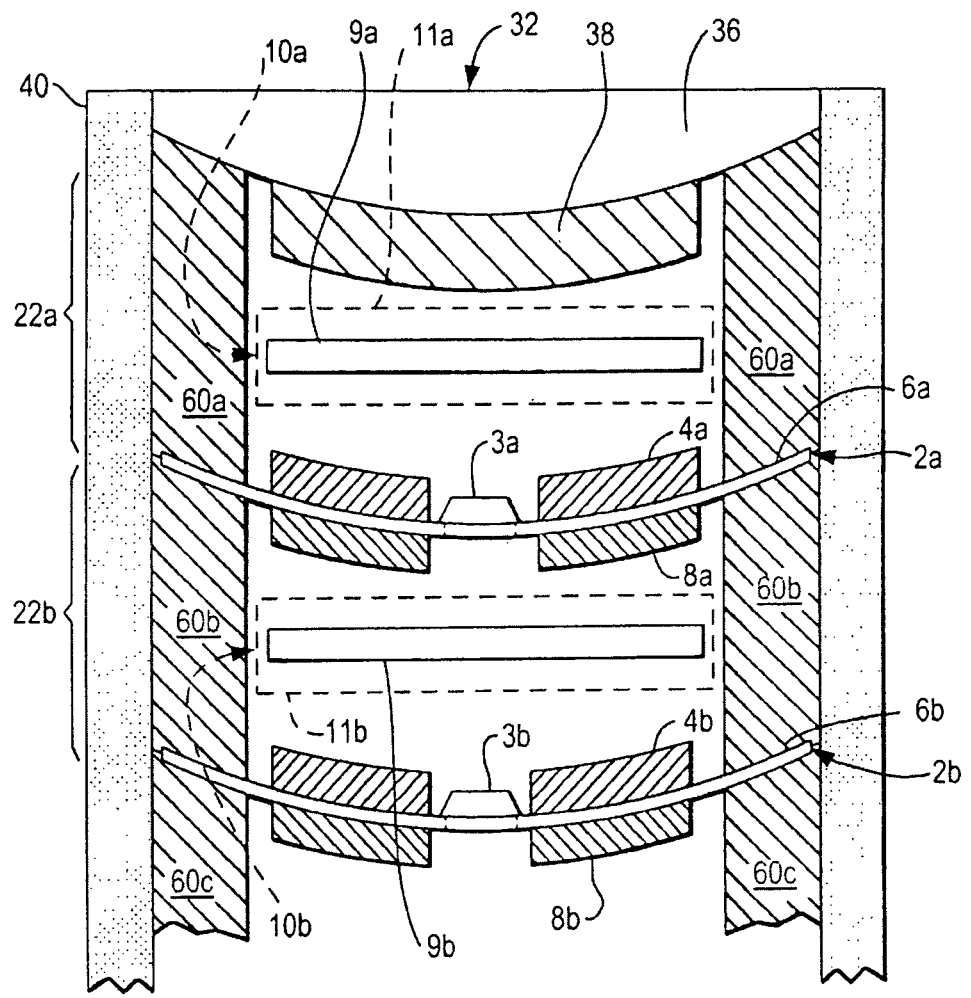
FIG. 8 shows a detailed schematic cross-sectional view of a particular portion of the bi-polar battery of FIG. 5.
Figure 9:
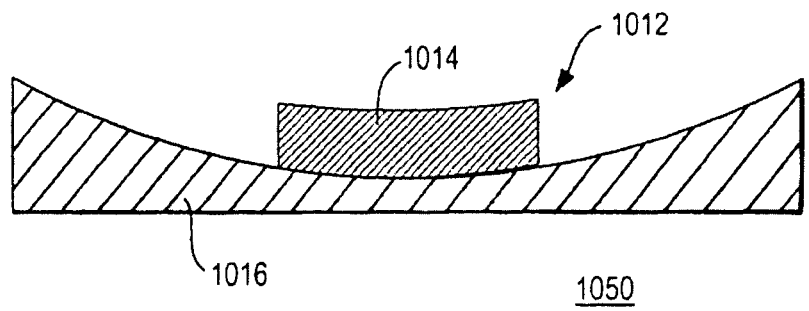
FIG. 9 shows a schematic cross-sectional view of certain elements in a first stage of a method for forming a stacked bi-polar battery according to an embodiment of the invention.

Referring now to FIG. 8, there is shown an exploded view of two particular cell segments 22 of battery 50, according to an embodiment of the invention. Cell segment 22a may include substrate 36 and negative electrode layer 38 of MPU 32, electrolyte layer 10a, as well as positive electrode layer 4a and substrate 6a of BPU 2a. Cell segment 22b may include substrate 6a and negative electrode layer 8a of BPU 2a, electrolyte layer 10b, as well as positive electrode layer 4b and substrate 6b of BPU 2b. As described above, each electrolyte layer 10 may include a separator 9 and an electrolyte 11. A sealant or gasket 60 may be provided about electrolyte layer 10 of each cell segment 22 such that separator 9 and electrolyte 11 of that segment may be sealed within the space defined by gasket 60 and the adjacent electrode units of that particular cell segment.

As shown in FIG. 8, for example, gasket 60a may surround electrolyte layer 10a such that its separator 9a and electrolyte 11a may be completely sealed within the space defined by gasket 60a, MPU 32, and BPU 2a of cell segment 22a. Likewise, as shown in FIG. 8, for example, gasket 60b may surround electrolyte layer 10b such that its separator 9b and electrolyte 11b may be completely sealed within the space defined by gasket 60b, BPU 2a, and BPU 2b of cell segment 22b.

The sealant or gasket of each cell segment may form seals with various portions of the electrode units of the cell for sealing its electrolyte. As shown in FIG. 8, for example, a gasket may form a seal with a portion of the top or bottom of a substrate (see, e.g., gasket 60a contacting the bottom side of substrate 36 and the top side and outer side of substrate 6a).

In certain embodiments of the invention, in order to create a better seal, one or more portions of the surface area of the gasket and the surface area of an adjacent electrode unit that contact each other may each be reciprocally or correspondingly grooved, chamfered, or shaped. At least a portion of a surface of a gasket may be shaped correspondingly to at least a portion of a surface of an electrode unit such that the two surfaces may mate together to restrict certain types of relative movement between the two surfaces and to self-align the gasket and the electrode unit during the manufacture of the battery, for example. This groove or detent formed by the mating of reciprocally shaped portions of a gasket and adjacent substrate, for example, may thereby increase the size of their mated contact area and may thereby provide a larger path of resistance for any fluid (e.g., electrolyte) attempting to break the seal created between the mated contact area of the gasket and substrate.

The substrates used to form the electrode units of the invention (e.g., substrates 6, 16, and 36) may be formed of any suitable conductive and impermeable material, including, but not limited to, a non-perforated metal foil, aluminum foil, stainless steel foil, cladding material comprising nickel and aluminum, cladding material comprising copper and aluminum, nickel plated steel, nickel plated copper, nickel plated aluminum, gold, silver, or combinations thereof, for example. Each substrate may be made of two or more sheets of metal foils adhered to one another, in certain embodiments. The substrate of each BPU may typically be between 0.025 and 5 millimeters thick, while the substrate of each MPU may be between 0.025 and 10 millimeters thick and act as terminals to the battery, for example. Metalized foam, for example, may be combined with any suitable substrate material in a flat metal film or foil, for example, such that resistance between active materials of a cell segment may be reduced by expanding the conductive matrix throughout the electrode.

The positive electrode layers provided on these substrates to form the electrode units of the invention (e.g., positive electrode layers 4 and 14) may be formed of any suitable active material, including, but not limited to, nickel hydroxide ($Ni(OH)_2$), zinc (Zn), or combinations thereof, for example. The positive active material may be sintered and impregnated, coated with an aqueous binder and pressed, coated with an organic binder and pressed, or contained by any other suitable method of containing the positive active material with other supporting chemicals in a conductive matrix. The positive electrode layer of the electrode unit may have particles, including, but not limited to, metal hydride (MH), Pd, Ag, or combinations thereof, infused in its matrix to reduce swelling, for example. This may increase cycle life, improve recombination, and reduce pressure within the cell segment, for example. These particles, such as MH, may also be in a bonding of the active material paste, such as $Ni(OH)_2$, to improve the electrical conductivity within the electrode and to support recombination.

The negative electrode layers provided on these substrates to form the electrode units of the invention (e.g., negative electrode layers 8 and 38) may be formed of any suitable active material, including, but not limited to, MH, Cd, Mn, Ag, or combinations thereof, for example. The negative active material may be sintered, coated with an aqueous binder and pressed, coated with an organic binder and pressed, or contained by any other suitable method of containing the negative active material with other supporting chemicals in a conductive matrix, for example. The negative electrode side may have chemicals including, but not limited to, Ni, Zn, Al, or combinations thereof, infused within the negative electrode material matrix to stabilize the structure, reduce oxidation, and extend cycle life, for example.

Various suitable binders, including, but not limited to, organic CMC binder, Creyton rubber, PTFE (Teflon), or combinations thereof, for example, may be mixed with the active material layers to hold the layers to their substrates. Ultra-still binders, such as 200 ppi nickel foam, may also be used with the stacked battery constructions of the invention.

The separator of each electrolyte layer of the battery of the invention (e.g., separator 9 of each electrolyte layer 10) may be formed of any suitable material that electrically isolates its two adjacent electrode units while allowing ionic transfer between those electrode units. The separator may contain cellulose super absorbers to improve filling and act as an electrolyte reservoir to increase cycle life, wherein the separator may be made of a polyabsorb diaper material, for example. The separator may, thereby, release previously absorbed electrolyte when charge is applied to the battery. In certain embodiments, the separator may be of a lower density and thicker than normal cells so that the Inter-Electrode-Spacing (IES) may start higher than normal and be continually reduced to maintain the C-rate and capacity of the battery over its life as well as to extend the life of the battery.

The separator may be a thinner than normal material bonded to the surface of the active material on the electrode units to reduce shorting and improve recombination. This separator material may be sprayed on, coated on, or pressed on, for example. The separator may have a recombination agent attached thereto, in certain embodiments. This agent may be infused within the structure of the separator (e.g., this may be done by physically trapping the agent in a wet process using a PVA to bind the agent to the separator fibers, or the agent may be put therein by electro-deposition), or it may be layered on the surface by vapor deposition, for example. The separator may be made of any suitable material or agent that effectively supports recombination, including, but not limited to, Pb, Ag, or combinations thereof, for example. While the separator may present a resistance if the substrates of a cell move toward each other, a separator may not be provided in certain embodiments of the invention that may utilize substrates stiff enough not to deflect.

The electrolyte of each electrolyte layer of the battery of the invention (e.g., electrolyte 11 of each electrolyte layer 10) may be formed of any suitable chemical compound that may ionize when dissolved or molten to produce an electrically conductive medium. The electrolyte may be a standard electrolyte of any suitable chemical, such as, but not limited to, NiMH, for example. The electrolyte may contain additional chemicals, including, but not limited to, lithium hydroxide (LiOH), sodium hydroxide (NaOH), calcium hydroxide (CaOH), potassium hydroxide (KOH), or combinations thereof, for example. The electrolyte may also contain additives to improve recombination, such as, but not limited to, $Ag(OH)_2$, for example. The electrolyte may also contain RbOH, for example, to improve low temperature performance. In some embodiments of the invention, the electrolyte (e.g., electrolyte 11) may be frozen within the separator (e.g., separator 9) and then thawed after the battery is completely assembled. This may allow for particularly viscous electrolytes to be inserted into the electrode unit stack of the battery before the gaskets have formed substantially fluid tight seals with the electrode units adjacent thereto.

The seals or gaskets of the battery of the invention (e.g., gaskets 60) may be formed of any suitable material or combination of materials that may effectively seal an electrolyte within the space defined by the gasket and the electrode units adjacent thereto. In certain embodiments, the gasket may be formed from a solid seal barrier or loop, or multiple loop portions capable of forming a solid seal loop, that may be made of any suitable nonconductive material, including, but not limited to, nylon, polypropylene, cell gard, rubber, PVOH, or combinations thereof, for example. A gasket formed from a solid seal barrier may contact a portion of an adjacent electrode to create a seal therebetween.

Alternatively, the gasket may be formed from any suitable viscous material or paste, including, but not limited to, epoxy, brea tar, electrolyte (e.g., KOH) impervious glue, compressible adhesives (e.g., two-part polymers, such as Loctite® brand adhesives made available by the Henkel Corporation, that may be formed from silicon, acrylic, and/or fiber reinforced plastics (FRPs) and that may be impervious to electrolytes), or combinations thereof, for example. A gasket formed from a viscous material may contact a portion of an adjacent electrode to create a seal therebetween. In yet other embodiments, a gasket may be formed by a combination of a solid seal loop and a viscous material, such that the viscous material may improve sealing between the solid seal loop and an adjacent electrode unit. Alternatively or additionally, an electrode unit itself may be treated with viscous material before a solid seal loop, a solid seal loop treated with additional viscous material, an adjacent electrode unit, or an adjacent electrode unit treated with additional viscous material, is sealed thereto, for example.

Moreover, in certain embodiments, a gasket or sealant between adjacent electrode units may be provided with one or more weak points that may allow certain types of fluids (i.e., certain liquids or gasses) to escape therethrough (e.g., if the internal pressures in the cell segment defined by that gasket increases past a certain threshold). Once a certain amount of fluid escapes or the internal pressure decreases, the weak point may reseal. A gasket formed at least partially by certain types of suitable viscous material or paste, such as brai, may be configured or prepared to allow certain fluids to pass therethrough and configured or prepared to prevent other certain fluids to pass therethrough. Such a gasket may prevent any electrolyte from being shared between two cell segments that may cause the voltage and energy of the battery to fade (i.e., discharge) quickly to zero.

As mentioned above, one benefit of utilizing batteries designed with sealed cells in a stacked formation (e.g., bi-polar battery 50) may be an increased discharge rate of the battery. This increased discharge rate may allow for the use of certain less-corrosive electrolytes (e.g., by removing or reducing the whetting, conductivity enhancing, and/or chemically reactive component or components of the electrolyte) that otherwise might not be feasible in prismatic or wound battery designs. This leeway that may be provided by the stacked battery design to use less-corrosive electrolytes may allow for certain epoxies (e.g., J-B Weld epoxy) to be utilized when forming a seal with gaskets that may otherwise be corroded by more-corrosive electrolytes.

The case or wrapper of the battery of the invention (e.g., case 40) may be formed of any suitable nonconductive material that may seal to the terminal electrode units (e.g., MPUs 12 and 32) for exposing their conductive substrates (e.g., substrates 16 and 36) or their associated leads (i.e., leads 13 and 33). The wrapper may also be formed to create, support, and/or maintain the seals between the gaskets and the electrode units adjacent thereto for isolating the electrolytes within their respective cell segments. The wrapper may create and/or maintain the support required for these seals such that the seals may resist expansion of the battery as the internal pressures in the cell segments increase. The wrapper may be made of any suitable material, including, but not limited to, nylon, any other polymer or elastic material, including reinforced composites, nitrile rubber, or polysulfone, or shrink wrap material, or any rigid material, such as enamel coated steel or any other metal, or any insulating material, or combinations thereof, for example. In certain embodiments, the wrapper may be formed by an exoskeleton of tension clips, for example, that may maintain continuous pressure on the seals of the stacked cells. A non-conductive barrier may be provided between the stack and wrapper to prevent the battery from shorting.

With continued reference to FIG. 6, for example, bi-polar battery 50 of the invention may include a plurality of cell segments (e.g., cell segments 22a-22e) formed by MPUs 12 and 32, and the stack of one or more BPUs 2 (e.g., BPUs 2a-2d) therebetween. In accordance with an embodiment of the invention, the thicknesses and materials of each one of the substrates (e.g., substrates 6a-6d, 16, and 36), the pressure equalization valves (e.g., valves 3a-3d), the electrode layers (e.g., positive layers 4a-d and 14, and negative layers 8a-8d and 38), the electrolyte layers (e.g., layers 10a-10e), and the gaskets (e.g., gaskets 60a-60e) may differ from one another, not only from cell segment to cell segment, but also within a particular cell segment. This variation of geometries and chemistries, not only at the stack level, but also at the individual cell level, may create batteries with various benefits and performance characteristics.

Additionally, the materials and geometries of the substrates, pressure equalization valves, electrode layers, electrolyte layers, and gaskets may vary along the height of the stack from cell segment to cell segment. With further reference to FIG. 6, for example, the electrolyte 11 used in each of the electrolyte layers 10 of battery 50 may vary based upon how close its respective cell segment 22 is to the middle of the stack of cell segments. For example, innermost cell segment 22c (i.e., the middle cell segment of the five (5) segments 22 in battery 50) may include an electrolyte layer (i.e., electrolyte layer 10c) that is formed of a first electrolyte, while middle cell segments 22b and 22d (i.e., the cell segments adjacent the terminal cell segments in battery 50) may include electrolyte layers (i.e., electrolyte layers 10b and 10d, respectively) that are each formed of a second electrolyte, while outermost cell segments 22a and 22e (i.e., the outermost cell segments in battery 50) may include electrolyte layers (i.e., electrolyte layers 10a and 10e, respectively) that are each formed of a third electrolyte. By using higher conductivity electrolytes in the internal stacks, the resistance may be lower such that the heat generated may be less. This may provide thermal control to the battery by design instead of by external cooling methods.

As another example, the active materials used as electrode layers in each of the cell segments of battery 50 may also vary based upon how close its respective cell segment 22 is to the middle of the stack of cell segments. For example, innermost cell segment 22c may include electrode layers (i.e., layers 8b and 4c) formed of a first type of active materials having a first temperature and/or rate performance, while middle cell segments 22b and 22d may include electrode layers (i.e., layers 8a/4b and layers 8c/4d) formed of a second type of active materials having a second temperature and/or rate performance, while outermost cell segments 22a and 22e may include electrode layers (i.e., layers 38/4a and layers 8d/14) formed of a third type of active materials having a third temperature and/or rate performance. As an example, a battery stack may be thermally managed by constructing the innermost cell segments with electrodes of nickel cadmium, which may better absorb heat, while the outermost cell segments may be provided with electrodes of nickel metal hydride, which may need to be cooler, for example. Alternatively, the chemistries or geometries of the battery may be asymmetric, where the cell segments at one end of the stack may be made of a first active material and a first height, while the cell segments at the other end of the stack may be of a second active material and a second height.

Moreover, the geometries of each of the cell segments of battery 50 may also vary along the stack of cell segments. Besides varying the distance between active materials within a particular cell segment, certain cell segments 22 may have a first distance between the active materials of those segments, while other cell segments may have a second distance between the active materials of those segments. In any event, the cell segments or portions thereof having smaller distances between active material electrode layers may have higher power, for example, while the cell segments or portions thereof having larger distances between active material electrode layers may have more room for dendrite growth, longer cycle life, and/or more electrolyte reserve, for example. These portions with larger distances between active material electrode layers may regulate the charge acceptance of the battery to ensure that the portions with smaller distances between active material electrode layers may charge first, for example.

In an embodiment, the geometries of the electrode layers (e.g., positive layers 4a-d and 14, and negative layers 8a-8d and 38 of FIG. 6) of battery 50 may vary along the radial length of substrate 6. With respect to FIG. 6, the electrode layers are of uniform thickness and are symmetric about the dished electrode shape. In an embodiment, the electrode layers may be non-uniform. For example, with reference to FIG. 16, the positive active material electrode layer and negative active material electrode layer thicknesses may vary with radial position on the curved surface. For example, positive electrode layer 304a may have a relatively small thickness near the center of BPU 302a, and may have a relatively larger thickness near gasket 360a. Similarly, negative electrode layer 308a may have a relatively small thickness near the center of BPU 302a, and may have a relatively larger thickness near gasket 360a. Cell segment 322b may include negative electrode layer 308a and substrate 306a of BPU 302a, positive electrode layer 304b and substrate 306b of BPU 302b adjacent to BPU 302a, and electrolyte layer 310 between BPU 302a and BPU 302b. When BPU 302a and BPU 302b are substantially oriented in such a way that the "dish shaped" substrates 6a-b are concave-down, free electrolyte may pool in area 380 of cell segment 322b. Thus, the electrode layers may take advantage of the excess or free electrolyte 380 that forms during each cycle of the charge and discharge of the cell stack. As mentioned above, the cell segments or portions thereof having smaller distances between active material electrode layers may have higher power, for example.

In an embodiment, the geometries of the electrode layers (e.g., positive layers 4a-d and 14, and negative layers 8a-8d and 38 of FIG. 6) of battery 50 may vary along the radial length of substrate 6 in such a way that a given BPU (e.g., BPU 302c in FIG. 16) has multiple geometries of an active material. For example, positive active material electrode 304c may have a first geometry 390 on a first portion and a second geometry 390' on a second portion. Similarly, negative active material electrode 308c may have a first geometry 391 on a first portion and a second geometry 391' on a second portion. Other geometries and combinations of geometries may also be used for an active material layer of a BPU.

As mentioned above, a method of producing the bi-polar battery of this invention may generally include the steps of providing an MPU and stacking one or more BPUs thereon with electrolyte layers and gaskets therebetween, before finally topping off the stack with another MPU of opposite polarity. For example, a method of producing a stacked bi-polar battery 1050 according to the invention is described with respect to FIGS. 9-14. For example, with respect to FIG. 9, a positive MPU 1012 may initially be provided with an impermeable conductive substrate 1016 and a positive active material electrode layer 1014 coated thereon, both being substantially "dish shaped".

Figure 10:
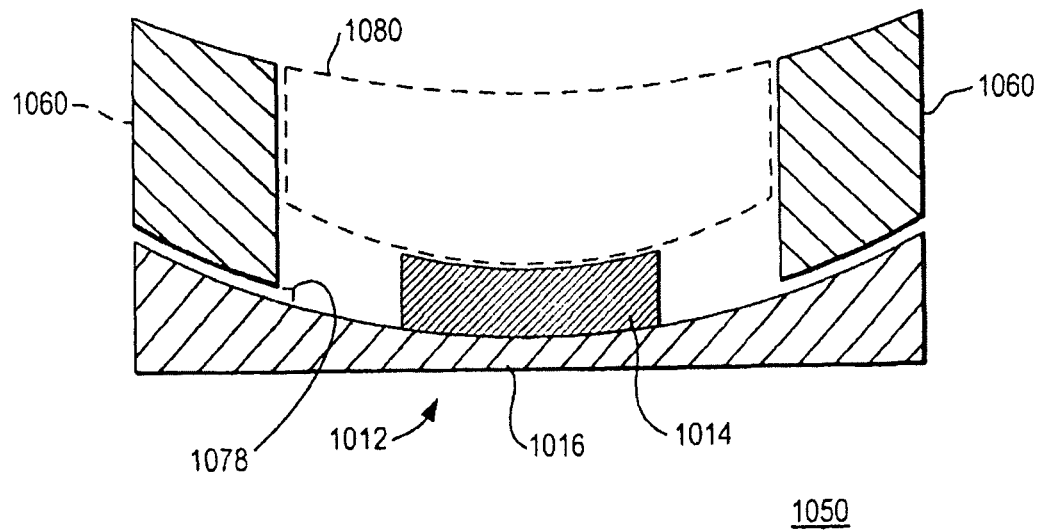
FIG. 10 shows a schematic cross-sectional view of certain elements in a second stage of a method for forming a stacked bi-polar battery according to an embodiment of the invention.

Next, a gasket 1060 may be stacked upon substrate 1016 about electrode layer 1014 (see, e.g., FIG. 10). Once gasket 1060 has been stacked on top of MPU 1012, a substantially fluid tight cup-shaped receptacle (see, e.g., space 1080) may thus be defined by the inner side walls of gasket 1060 and the portions of MPU 1012 therebetween. The angle formed between the inner side walls of the gasket and the portions of the electrode unit therebetween (e.g., angle 1078 between the inner side walls of gasket 1060 and the portions of MPU 1012 therebetween in FIG. 10) may be of any suitable angle, including right angles, obtuse angles, or acute angles.

Figure 11:
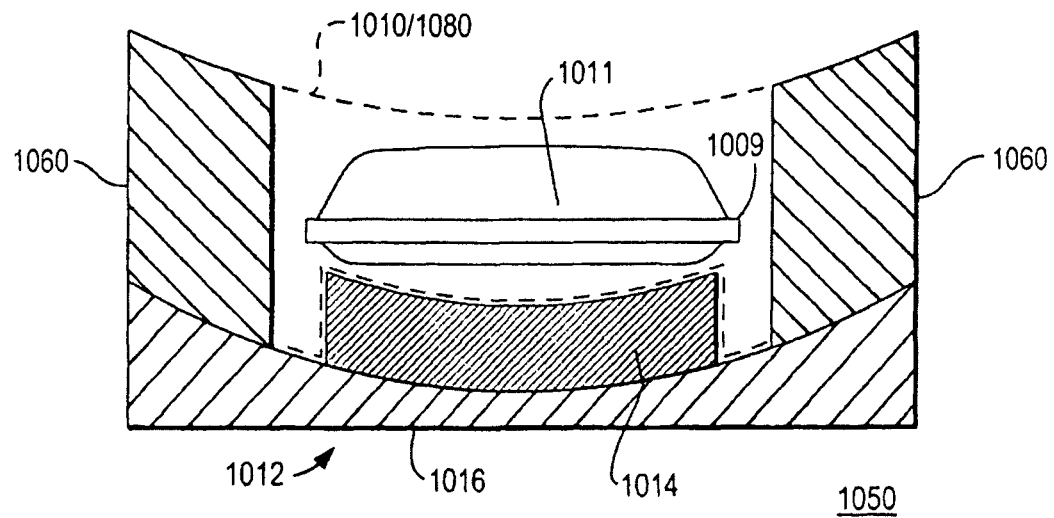
FIG. 11 shows a schematic cross-sectional view of certain elements in a third stage of a method for forming a stacked bi-polar battery according to an embodiment of the invention.

Next, a separator 1009 and an electrolyte 1011 may be deposited within the inner walls of gasket 1060 on top of positive electrode layer 1014 to define an electrolyte layer 1010 within the space 1080 (see, e.g., FIG. 11). When the electrolyte to be used is quite viscous, the seal created between the gasket and the MPU may allow for the electrolyte to be easily injected into space 1080 without chance of leaking. It is to be understood that if the electrolyte is not viscous upon insertion into the stack (e.g., in an embodiment where the electrolyte is frozen within the separator), the electrolyte layer may be stacked upon the MPU before the gasket is fitted thereon. The "dish shaped" substrate 1016 may be concave-up and may be used as a temporary location for the electrolyte while being absorbed by separator 1009 and positive electrode layer 1014, thereby simplifying this production step. In addition, the geometry of dish shaped substrate 1016 may substantially prevent substrate 1016 from translating when electrolyte 1011 is deposited.

Figure 12:
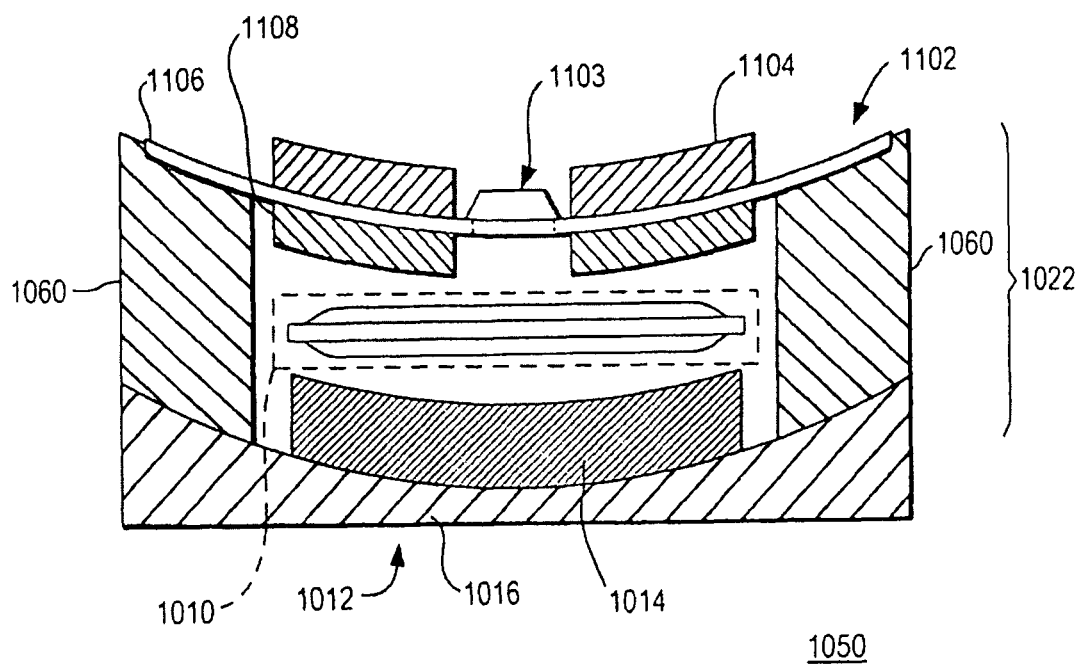
FIG. 12 shows a schematic cross-sectional view of certain elements in a fourth stage of a method for forming a stacked bi-polar battery according to an embodiment of the invention.

Once separator 1009 and electrolyte 1011 of electrolyte layer 1010 have been deposited within space 1080 defined by gasket 1060 and MPU 1012, and the electrolyte has been substantially absorbed, a first BPU 1102 may be stacked thereupon (see, e.g., FIG. 12). As shown in FIG. 12, BPU 1102 may include an impermeable conductive substrate 1106 having pressure equalization valve 1103 and a positive electrode layer 1104 and a negative electrode layer 1108 coated on opposite sides thereof. With negative electrode layer 1108 of BPU 1102 facing downwards towards positive electrode layer 1014 of MPU 1012, BPU 1102 may be stacked upon gasket 1060. Once BPU 1102 has been stacked on top of gasket 1060, and thus MPU 1012, a first cell segment 1022 may exist. Moreover, a substantially fluid tight seal may thereby be defined by substrate 1106, substrate 1036, and gasket 1060 about electrolyte layer 1010 (and thus electrolyte 1011).

Figure 13:
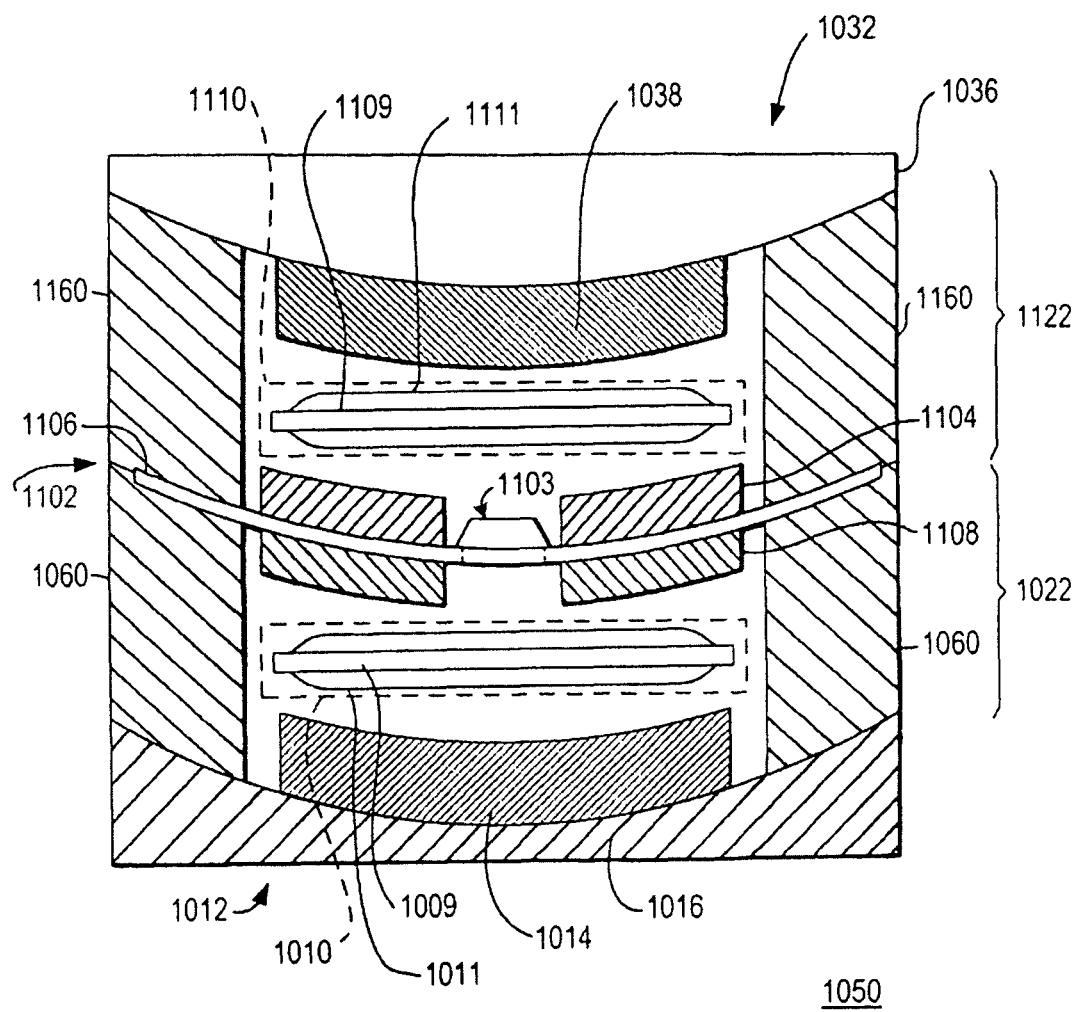
FIG. 13 shows a schematic cross-sectional view of certain elements in a fifth stage of a method for forming a stacked bi-polar battery according to an embodiment of the invention.

Next, a separator 1109 and an electrolyte 1111 may be deposited within the inner walls of gasket 1160 on top of positive electrode layer 1104 to define an electrolyte layer 1110 (see, e.g., FIG. 13). The electrolyte may not leak through the bottom of BPU 1102 during these process steps. Thus, a semi-permeable membrane or a rupture disk (e.g., equalization valve 1103) may be provided to substantially prevent electrolyte from draining into the lower cell.

Once this first cell segment 1022 has been created by stacking gasket 1060, electrolyte layer 1010, and BPU 1102 on top of MPU 1012, as described above with respect to FIGS. 9-12, additional BPUs may be stacked thereon in a similar fashion, if desired. Once the desired amount of BPUs has been stacked for the bi-polar battery, a second MPU may be stacked thereon. With reference to FIG. 13, a negative MPU 1032 may be stacked on top of the top most BPU (in this embodiment, only one BPU has been provided, therefore BPU 1102 is that top most BPU). However, before MPU 1032 is stacked upon BPU 1102, an additional gasket (i.e., gasket 1160) and electrolyte layer (i.e., electrolyte layer 1110 with separator 1109 and electrolyte 1111) may be provided as described above with respect to gasket 1060 and electrolyte layer 1010.

Negative MPU 1032 may be provided with an impermeable conductive substrate 1036 and a negative active material electrode layer 1038 coated thereon. With negative electrode layer 1038 of MPU 1032 facing downwards towards positive electrode layer 1104 of BPU 1102, MPU 1032 may be stacked upon gasket 1160. Once MPU 1032 has been stacked firmly on top of gasket 1160, and thus BPU 1102, a second cell segment (i.e., segment 1122) may exist. Moreover, a substantially fluid tight seal may thereby be defined by substrate 1036, substrate 1106, and gasket 1160 about electrolyte layer 1110 (and thus electrolyte 1111).

Figure 14:
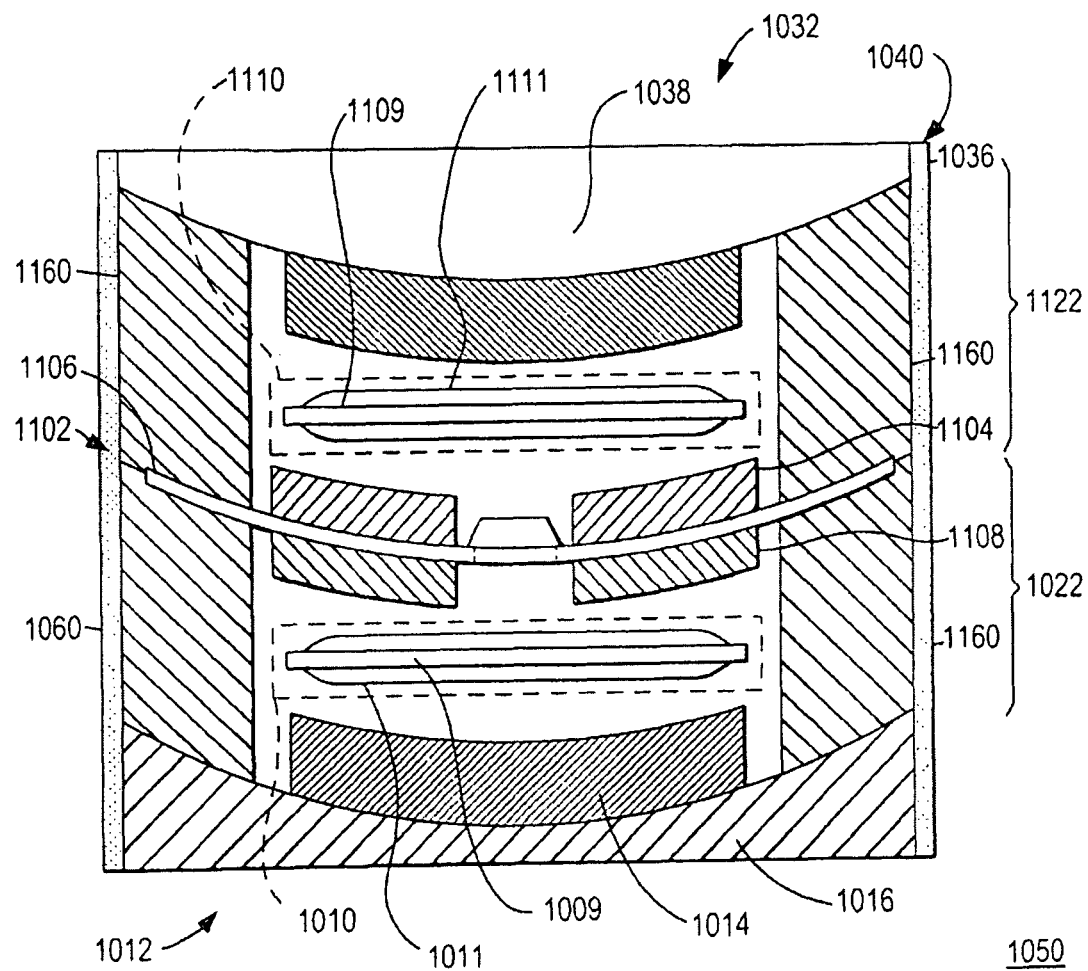
FIG. 14 shows a schematic cross-sectional view of certain elements in a sixth stage of a method for forming a stacked bi-polar battery according to an embodiment of the invention.

Once a stack is manufactured to include a positive MPU, a negative MPU, and at least one BPU therebetween, thereby forming a stack of cell segments, as described above with respect to FIGS. 9-13, for example, a case or wrapper may be provided to seal the contents of the stack for forming a functional stacked bi-polar battery of the invention. In an embodiment, as shown in FIG. 14, a wrapper 1040 may be provided about the stack of cell segments (i.e., cell segments 1022 and 1122), such that the terminal electrode layers (i.e., positive electrode layer 1014 and negative electrode layer 1038) may be exposed (e.g., via at least a portion of conductive substrates 1016 and 1036, respectively), and such that a sealed arrangement may be provided by the wrapper about the contents of the stack to provide a stacked bi-polar battery 1050. For example, pressure may be exerted by the wrapper on stacked bi-polar battery 1050 to maintain the sealed relationship between each gasket and the electrode units adjacent thereto in the stack for creating substantially fluid tight barriers about each electrolyte layer.

Figure 15:
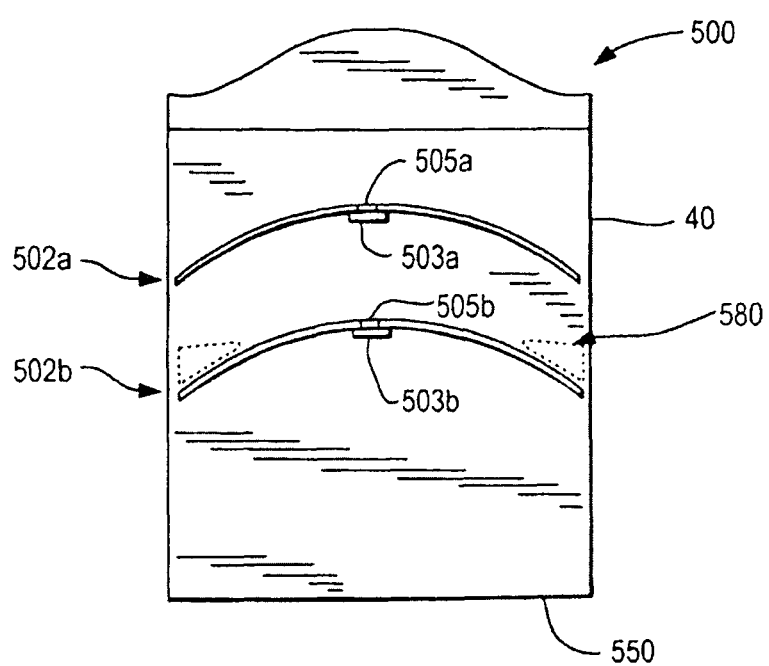
FIG. 15 shows a schematic cross-sectional view of a stacked bi-polar battery having a domed top in accordance with an embodiment of the present invention.
Figure 16:
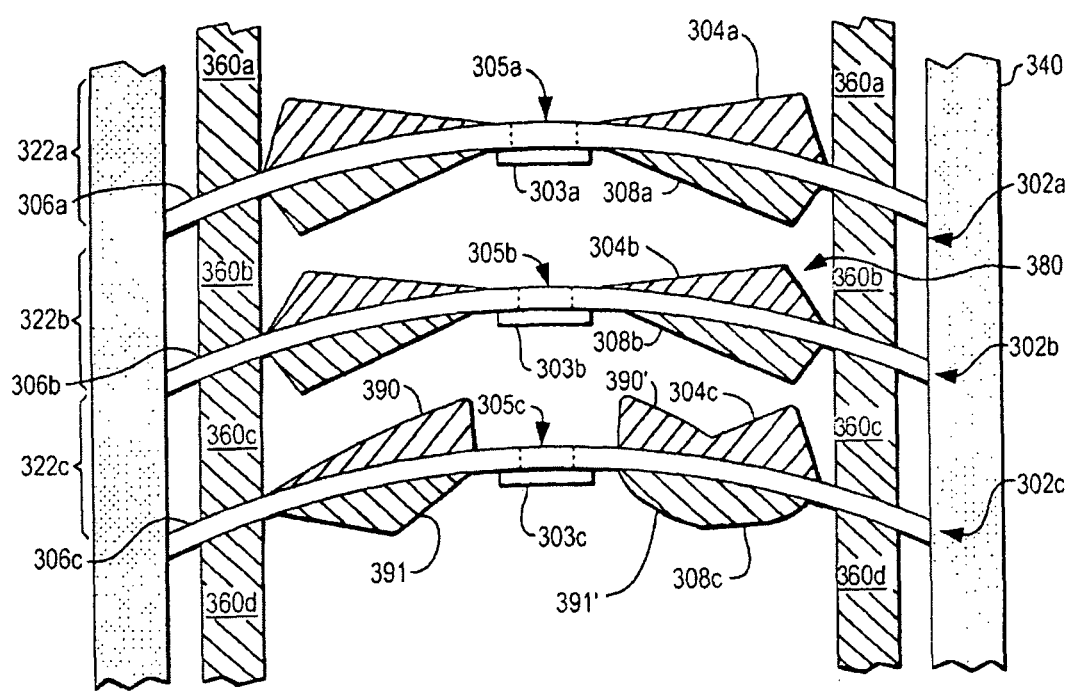
FIG. 16 shows a schematic cross-sectional view of a stacked bi-polar battery having non-uniform active material electrode layers in accordance with an embodiment of the present invention.

In an embodiment, stacked bi-polar battery 50 may be structured so that dome-shaped top 500, as shown in FIG. 15, may be disposed on the top of battery wrapper 40 and a flat edge 550 may be disposed on the bottom of battery wrapper 40. For example, domed top 500 may be desired in a stacked battery wherein the pressure equalization valves are rupture disks (see, e.g., rupture disk valves 503*a-b*). Since orientation may be important in substantially preventing electrolyte from transferring to an adjacent cell if a rupture disk has opened, domed top 500 may substantially ensure a stacked battery remains in an orientation where domed top 500 is upright and thus BPUs 502*a-b* are concave-down. In the upright position, free electrolyte 580 may gather around the edge of the concave-down "dish shaped" electrode (e.g., BPUs 502*a-b*) and free electrolyte 580 may not be sufficiently able to reach the open hole 505*b* at the center of BPU 502*b*, for example, which may be relatively higher than the edges. The battery may be laid on its side with substantially the same effect.

Although each of the above described and illustrated embodiments of a stacked battery show a cell segment including a gasket sealed to each of a first and second electrode unit for sealing an electrolyte therein, it should be noted that each electrode unit of a cell segment may be sealed to its own gasket, and the gaskets of two adjacent electrodes may then be sealed to each other for creating the sealed cell segment.

In certain embodiments, a gasket may be injection molded to an electrode unit or another gasket such that they may be fused together to create a seal. In certain embodiments, a gasket may be ultrasonically welded to an electrode unit or another gasket such that they may together form a seal. In other embodiments, a gasket may be thermally fused to an electrode unit or another gasket, or through heat flow, whereby a gasket or electrode unit may be heated to melt into an other gasket or electrode unit. Moreover, in certain embodiments, instead of or in addition to creating groove shaped portions in surfaces of gaskets and/or electrode units to create a seal, a gasket and/or electrode unit may be perforated or have one or more holes running through one or more portions thereof. Alternatively, a hole or passageway or perforation may be provided through a portion of a gasket such that a portion of an electrode unit (e.g., a substrate) may mold to and through the gasket. In yet other embodiments, holes may be made through both the gasket and electrode unit, such that each of the gasket and electrode unit may mold to and through the other of the gasket and electrode unit, for example.

Although each of the above described and illustrated embodiments of the stacked battery show a battery formed by stacking substrates having substantially round cross-sections into a cylindrical battery, it should be noted that any of a wide variety of shapes may be utilized to form the substrates of the stacked battery of the invention. For example, the stacked battery of the invention may be formed by stacking electrode units having substrates with cross-sectional areas that are rectangular, triangular, hexagonal, or any other imaginable shape or combination thereof.

While there have been described stacked batteries with reduced electrode plate deflection and improved pressure equalization, for example, it is to be understood that many changes may be made therein without departing from the spirit and scope of the present invention. It will also be understood that various directional and orientational terms such as "horizontal" and "vertical," "top" and "bottom" and "side," "length" and "width" and "height" and "thickness," "inner" and "outer," "internal" and "external," and the like are used herein only for convenience, and that no fixed or absolute directional or orientational limitations are intended by the use of these words. For example, the devices of this invention, as well as their individual components, may have any desired orientation. If reoriented, different directional or orientational terms may need to be used in their description, but that will not alter their fundamental nature as within the scope and spirit of this invention. Those skilled in the art will appreciate that the invention may be practiced by other than the described embodiments, which are presented for purposes of illustration rather than of limitation, and the invention is limited only by the claims which follow.

What is claimed is:

1. A bi-polar battery comprising:
   a positive mono-polar electrode unit;
   a negative mono-polar electrode unit;
   at least one bi-polar electrode unit stacked between said positive electrode unit and said negative electrode unit, wherein the at least one bi-polar electrode unit comprises a pressure equalization valve disposed in a substrate of the bi-polar electrode unit, wherein the pressure equalization valve is formed of a sealant and a graphitic carbon fiber material;
   an electrolyte layer provided between each pair of adjacent electrode units; and
   a gasket positioned about each of said electrolyte layers, wherein each of said electrolyte layers is sealed by its respective gasket and its respective pair of adjacent electrode units.

2. The battery of claim 1, wherein the pressure equalization valve is resistant to chemical corrosion.

3. The battery of claim 1, wherein the pressure equalization valve has at least one of nanometer sized perforations and micrometer sized perforations.

4. The battery of claim 3, wherein an electrolyte is prevented from passing between adjacent electrolyte layers by the pressure equalization valve.

5. The battery of claim 3, wherein a gas is permitted to pass between adjacent electrolyte layers by the perforations in the pressure equalization valve.

6. The battery of claim 1, wherein the graphitic carbon fiber material comprises
a graphitic carbon fiber bundle.

7. The battery of claim 6, wherein gas molecules are chemically transferred between adjacent electrolyte layers along the graphitic fiber bundle.

8. The battery of claim 6, wherein diffusion forces allow hydrogen molecules from an over pressurized electrolyte layer to travel along the surface of the graphitic fiber bundle.

9. The battery of claim 6, wherein an electrolyte is prevented from passing between adjacent electrolyte layers by the pressure equalization valve.

10. The battery of claim 6, wherein the graphitic carbon fiber bundle comprises about 1,000 fibrils cured within the sealant.

11. The battery of claim 1, wherein the substrate comprises a curved shape that prevents electrolyte from pooling around the pressure equalization valve.

12. An energy storage device comprising:
a substrate having a pressure equalization valve therein, wherein the pressure equalization valve allows gases to travel through the otherwise impervious substrate but prevents an electrolyte from traveling therethrough, and wherein the pressure equalization valve is formed of a sealant and a graphitic carbon fiber material.

13. The energy storage device of claim 12, wherein the graphitic carbon fiber material comprises a graphitic carbon fiber bundle.

14. The energy storage device of claim 13, wherein the graphitic carbon fiber bundle comprises about 1,000 fibrils cured within the sealant.

15. The energy storage device of claim 12, further comprising a positive active material electrode layer on a first side of the substrate and a negative active material electrode layer on a second side of the substrate opposite the first side.

16. The energy storage device of claim 15, wherein the pressure equalization valve is disposed in the substrate and surrounded on both sides of the substrate by the respective positive and negative active material electrode layers.

17. The energy storage device of claim 12, wherein the substrate has a curved shape that prevents electrolyte from pooling around the pressure equalization valve.

* * * * *